(12) United States Patent
Ishizuka

(10) Patent No.: US 6,172,439 B1
(45) Date of Patent: Jan. 9, 2001

(54) MOTOR ROTOR USING A CYLINDRICAL YOKE WITH SLIT

(75) Inventor: Yutaka Ishizuka, Nagano (JP)

(73) Assignee: Kabushiki Kaisha Sankyo Seiko Seisakusho, Tokyo (JP)

( * ) Notice: Under 35 U.S.C. 154(b), the term of this patent shall be extended for 0 days.

(21) Appl. No.: 09/290,177

(22) Filed: Apr. 13, 1999

(30) Foreign Application Priority Data

Apr. 13, 1998 (JP) .................................................. 10-099776

(51) Int. Cl.$^7$ ............................ H02K 15/00; H02K 7/00; H02K 5/00; H02K 21/22; H02K 1/22
(52) U.S. Cl. ...................... 310/156; 310/42; 310/67 R; 310/153; 310/91; 310/262; 310/265
(58) Field of Search ..................... 310/42, 67 R, 310/156, 218, 153, 154, 90, 91, 112, 261, 262, 265; 360/98.07, 99.04, 99.08; 29/598

(56) References Cited

U.S. PATENT DOCUMENTS

| 3,500,090 | * | 3/1970 | Baermann | 310/154 |
| 3,828,212 | * | 8/1974 | Harkness et al. | 310/153 |
| 4,012,651 | * | 3/1977 | Burson | 310/153 |
| 4,423,345 | * | 12/1983 | Nilsson | 310/153 |
| 4,996,613 | * | 2/1991 | Hishida | 360/99.08 |
| 5,331,238 | * | 7/1994 | Johnsen | 310/58 |
| 5,396,134 | | 3/1995 | Mochizuki | 310/67 R |
| 5,402,023 | | 3/1995 | Nakanishi et al. | 310/90 |

FOREIGN PATENT DOCUMENTS 60-139140   7/1985   (JP) .................................. H02K/1/28

* cited by examiner

Primary Examiner—Nestor Ramirez
Assistant Examiner—Guillermo Perez
(74) Attorney, Agent, or Firm—Sughrue, Mion, Zinn, Macpeak & Seas, PLLC

(57) ABSTRACT

A cylindrical yoke 8 bonded to an inner surface 44 of a cylindrical portion 43 of a rotor case 40 of a motor has a yoke separating slit 85 for separating the yoke 8 in the circumferential direction. A cylindrical rotor magnet 9 is partially bonded to an inner surface 81 of the yoke 8 at a plurality of bonded portions 10 formed apart from one another for the same intervals in the circumferential direction. When the cylindrical portion 43 has been expanded by heat, the yoke separating slit 85 is expanded and the yoke 8 follows the non-bonded portion of the cylindrical portion 43. Therefore, distortion of the cylindrical portion 43 can be prevented. In the non-bonded portions 11 between the yoke 8 and the rotor magnet 9, deformation occurs such that an inner surface 81 of the yoke 8 is separated from an outer surface 92 of the rotor magnet 9. Thus, damage of the rotor magnet 9 can be prevented.

12 Claims, 5 Drawing Sheets

MOTOR ROTOR USING A CYLINDRICAL YOKE WITH SLIT

BACKGROUND OF INVENTION

1. Field of Invention

The present invention relates to a motor, and more particularly to a high-speed rotating motor for uses as a rotating apparatus for a rotative polygonal mirror or the like.

2. Related Art

The motor for use as an apparatus for rotating a rotative polygonal mirror has a rotor case on which the rotative polygonal mirror is mounted, a frame for rotatively supporting the rotor case, a rotor magnet fixed to the rotor case through a yoke and an armature fixed to a frame such that the armature is positioned opposite to the rotor magnet.

The rotor case has a cylindrical portion which creates a space in which the armature is disposed. The cylindrical yoke is fixed to the inner surface of the cylindrical portion, while the cylindrical rotor magnet is fixed to the inner surface of the yoke. When the yoke and the rotor magnet are fixed to each other, the conventional method is performed such that the overall outer surface of the yoke is bonded to the inner surface of the cylindrical portion. Moreover, the overall outer surface of the rotor magnet is bonded to the inner surface of the yoke.

The rotor case is usually made of aluminum alloy having excellent machinability. On the other hand, in general, the yoke is manufactured by pressing a thin rolled plate and the rotor magnet is manufactured by sintering.

The motor structured as described above has the rotor case made of aluminum alloy and the yoke made of steel. Therefore, the rotor case has a thermal expansion coefficient larger than that of the yoke. It leads to a fact that the cylindrical portion of the rotor case greatly expands in radial direction as compared with the yoke when the ambient temperature has been raised. Since the conventional motor has the structure that the overall outer surface of the cylindrical yoke is bonded to the inner surface of the cylindrical portion, smooth expansion of the cylindrical portion of the rotor case is, however, prevented by the yoke. As a result, distortion of the cylindrical portion occurs. Thus, there arises a problem in that imbalance of the rotor case occurs.

The rotor magnet has a thermal expansion coefficient which is considerably smaller than that of the yoke. Therefore, when the yoke is expanded by heat, the rotor magnet cannot follow the expansion of the yoke. However, the conventional motor has the structure that the overall outer surface of the cylindrical rotor magnet is bonded to the inner surface of the cylindrical yoke. Therefore, when the yoke has been expanded, great force is exerted on the rotor magnet. Thus, there arises a problem in that brittle fracture of the rotor magnet occurs. When the cylindrical portion of the rotor case and the yoke have been deformed outwards in the radial direction during high speed rotation of the rotor case, the rotor magnet cannot be deformed by centrifugal force exerted on the rotor magnet. The reason for this is that the rotor magnet is a brittle member molded by sintering or the like. Since the conventional motor has the structure that the overall-outer surface of the cylindrical rotor magnet is bonded to the inner surface of the cylindrical yoke, the rotor magnet is pulled outwards in the radial direction through the yoke. Thus, there is a probability that brittle fracture occurs.

SUMMARY OF INVENTION

Accordingly, an object of the present invention is to provide a structure of a motor which is manufactured by bonding members made of materials having different physical properties to one another and with which excess stress is not exerted on a specific member in a case of thermal expansion or during high speed rotation.

An aspect of the present invention, there is provided a motor comprising:

a rotor case having a cylindrical portion;

a cylindrical yoke fixed to an inner surface of said cylindrical portion said yoke made of a magnetic material;

a cylindrical rotor magnet fixed to an inner surface of said yoke;

a frame for rotatively supporting said rotor case;

an armature fixed to said frame, said armature being opposite to said rotor magnet;

a yoke separating slit for permitting enlargement of a diameter of said yoke when said yoke separating slit expands in a circumferential direction of said yoke;

a plurality of yoke bonding portions where an-outer surface of said yoke is bonded to the inner surface of said cylindrical portion, said yoke bonding portions being apart from one another in the circumferential direction; and the inner surface of said cylindrical portion and the outer surface of said yoke being permitted to separate from and contact to one another between adjoining yoke bonding portions.

As described above, the motor according to the present invention has the yoke which is provided with yoke separating slit for separating the yoke in the circumferential direction. Therefore, if force for enlarging the diameter of the yoke is exerted, the yoke separating slit is widened. Thus, the diameter of the yoke can be enlarged. Therefore, if the ambient temperature is raised, the cylindrical portion of the rotor case is expanded greatly as compared with the yoke because the thermal expansion coefficient of the rotor case is larger than that of the yoke. In the foregoing case, the yoke separating slit is widened such the yoke separating slit is pulled by the cylindrical portion of the rotor case. Therefore, the yoke is deformed to follow the deformation of the cylindrical portion of the rotor case. Thus, excess force is not exerted on the cylindrical portion of the rotor case. As a result, distortion of the rotor case can be prevented. Thus, imbalance of the rotor case can be prevented.

DETAILED DESCRIPTION OF PREFERRED EMBODIMENTS

Embodiments of the present invention will now be described with reference to the drawings.

First Embodiment (Overall Structure)

Figure 1:
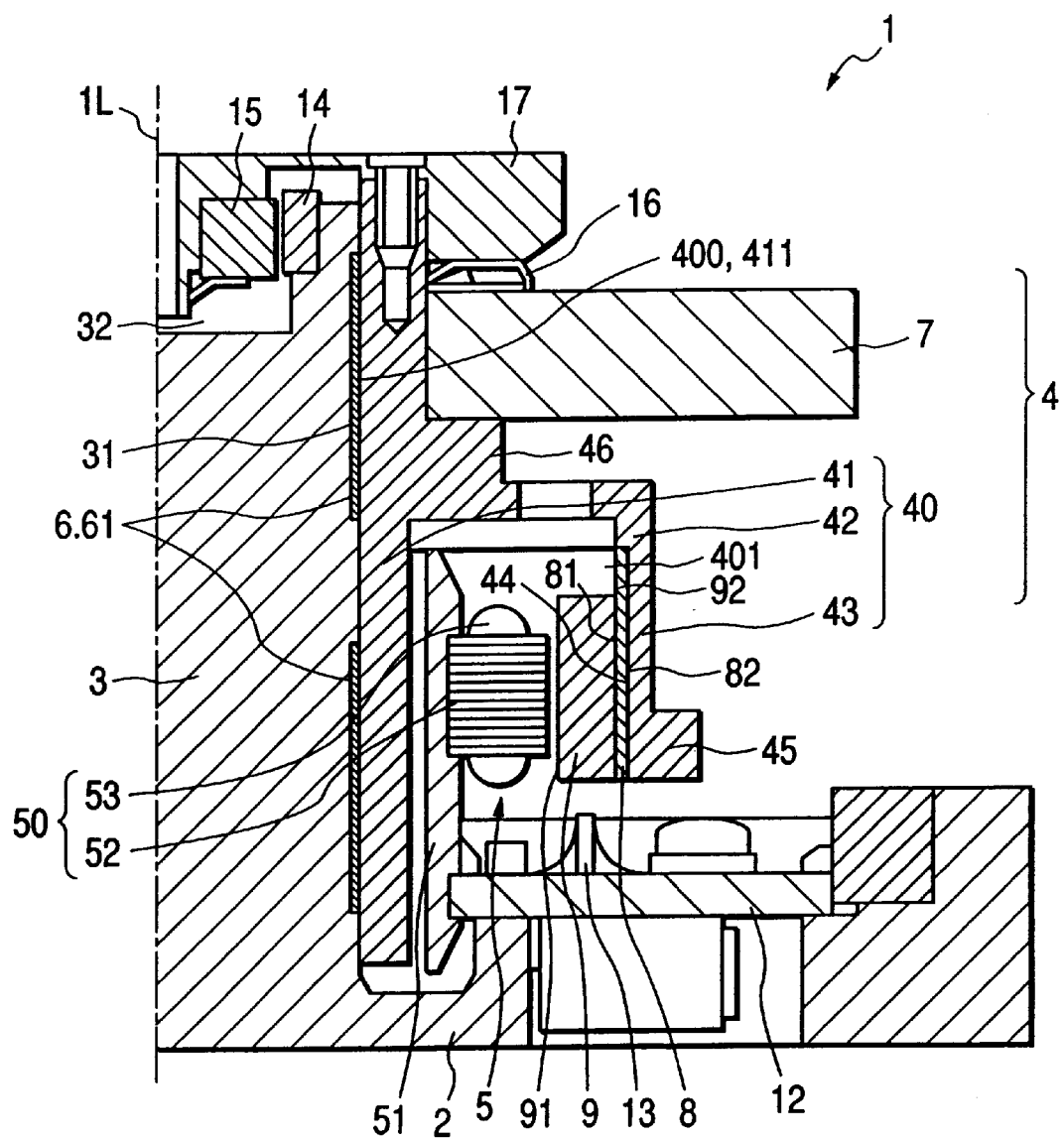
FIG. 1 is a half cross sectional view showing a motor according to a first embodiment of the present invention.

FIG. 1 is a half cross sectional view showing a motor according to a first embodiment of the present invention. As shown in FIG. 1, a motor 1 is used as a rotating apparatus for a rotary polygonal mirror 7. The motor 1 has a motor frame 2, a stationary shaft 3 stood erect on the motor frame 2, a rotor 4 which is rotatively supported by the outer surface of the stationary shaft 3 and on which the rotary polygonal mirror 7 is mounted and a stator 5 disposed opposite to the rotor 4.

The rotor 4 has a shaft hole 400. The stationary shaft 3 is inserted into the shaft hole 400. Upper and lower dynamic-pressure generating grooves 61 each having a known herringbone structure are formed in the outer surface 31 of the stationary shaft 3. Two dynamic-pressure bearings 6 are, in a usual manner, disposed between an inner surface 411 of the shaft hole 400 and an outer surface 31 of the stationary shaft 3.

The stator 5 has a cylindrical core holder 51 disposed to coaxially surround the stationary shaft 3 and stood erect on the motor frame 2. A stator core 52 is fixed to the side surface adjacent to the upper end of the core holder 51. In the stator core 52, a stator coil 53 is wound around a plurality of projecting salient poles formed in the radial direction and apart from one another so that an armature 50 is constituted. Note that a motor substrate 12 comprising a circuit board is disposed on the upper surface of the motor frame 2 disposed lower than the stator core 52 and an operating magnet 9. Electronic elements 13, such as connectors, are mounted on the motor substrate 12.

On the other hand, the rotor 4 has cup-shape rotor case 40 having a downward annular recess 401 in which the stator 5 is disposed. The rotor case 40 made of aluminum alloy has a cylindrical bearing portion 41 having a shaft hole 400 in the central portion thereof; an extending portion 42 annually and outwards extending from substantially intermediate position in the direction of an axial line 1L of the bearing portion 41; and a cylindrical portion 43 extending from the outer end of the extending portion 42 to a position lower than the direction of the axial line 1L.

As described later, a cylindrical yoke 8 is bonded to an inner surface 44 of the cylindrical portion 43. The cylindrical operating magnet 9 is bonded to an inner surface 81 of the yoke 8. The armature 50 is positioned opposite to an inner surface 91 of the operating magnet 9. Note that a flange 45 extending outwards in the radial direction is formed at the lower end portion of the cylindrical portion 43.

A cap 17 is screwed to the upper end of the bearing portion 41 through a mirror retaining spring 16 disposed below the cap 17. The cap 17 and the mirror retaining spring 16 press and secure the rotary polygonal mirror 7 to the polygonal-mirror mount portion 46 projecting over the upper surface of the extending portion 42.

A circular recess 32 is formed in the upper end surface of the stationary shaft 3. A cylindrical stator magnet 14 is secured to the side inner surface of the recess 32. A cylindrical rotor magnet 15 secured to the cap 17 is disposed on the inside of the stator magnet 14. The magnetic center in the direction of the axial line 1L of the rotor magnet 15 slightly deviates toward the stationary shaft 3 in the direction of the axial line 1L from the magnetic center of the stator magnet 14 in the direction of the axial line 1L. The same poles of the stator magnet 14 and the rotor magnet 15 are positioned opposite to one another. Therefore, magnetic repulsion generated between the stator magnet 14 and the rotor magnet 15 constitutes a thrust bearing which prevents looseness of the rotor 4 in the direction of the axial line 1L.

Structures of Yoke 8 and Rotor Magnet 9

Figure 2A:
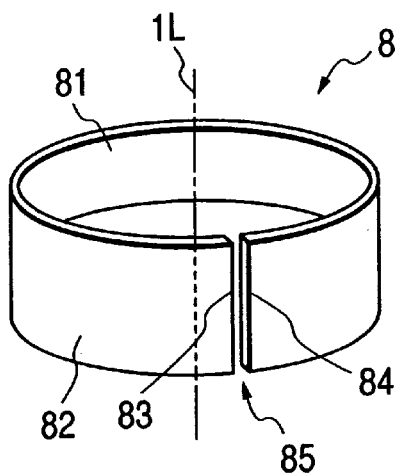
FIG. 2 (A) is a perspective view showing a yoke of the motor shown in FIG. 1 and FIG. 2 (B) is a perspective view showing a method of manufacturing the yoke shown in FIG. 2 (A)
Figure 2B:
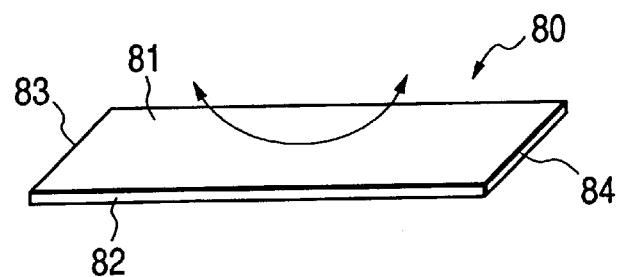

FIG. 2 (A) is a perspective view showing the yoke 8 for use in the motor 1 according to this embodiment. As shown in FIG. 2 (A), the yoke 8 according to this embodiment has a yoke separating slit 85 for separating the yoke 8 in the circumferential direction. The yoke separating slit 85 extends in the direction of the axial line 1L. As shown in FIG. 2 (B), the yoke 8 is manufactured into a cylindrical shape by bending one rectangular plate 80 made of a magnetic material, such as a rolled plate. Thus, the curvature of the inner surface 81 is substantially the same as that of an outer surface 92 of the operating magnet 9. Moreover, two ends 83 and 84 of the plate 80 in the lengthwise direction are positioned opposite to each other. A space between the two opposite ends 83 and 84 is formed into a yoke separating slit 85. The yoke separating slit 85 is a small gap for realizing a state in which the gap is narrowed when the motor 1 is assembled (at room temperatures and in a non-rotation state of the rotor 4) or when it is used at low temperatures.

Figure 3:
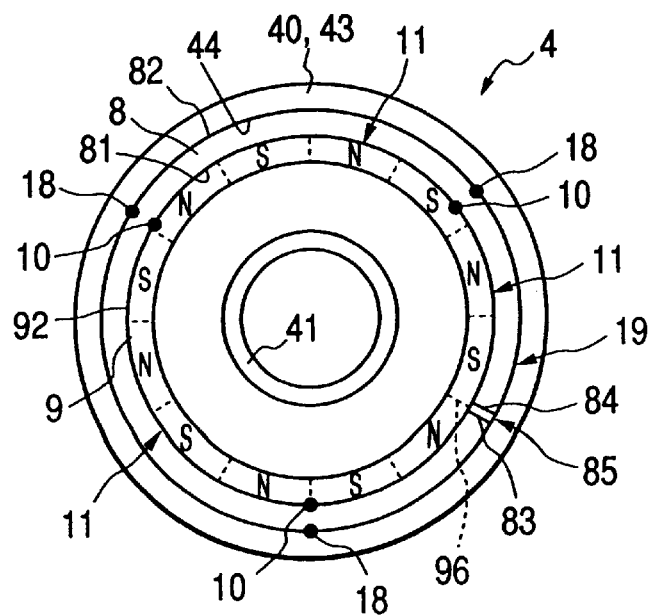
FIG. 3 is a bottom view showing a rotor of the motor shown in FIG. 1.

FIG. 3 is a bottom view showing the rotor 4. As shown in FIG. 3, an outer surface 82 of the yoke 8 is bonded to the inner surface 44 of the cylindrical portion 43 provided for the rotor case 40 at a plurality of yoke bonding portions 18 (three in FIG. 3) positioned at the same angular intervals in the circumferential direction. Therefore, portions formed between the outer surface 82 of the yoke 8 and the inner surface 44 of the cylindrical portion 43 and corresponding to the portions among the bonding portions 18 are formed into non-bonding portions 19 each of which is formed in a wide angular range.

The outer surface 92 of the operating magnet 9 made of a hard and brittle material is bonded to the inner surface 81 of the yoke 8. The partial bonding operation is performed at a plurality of magnet bonding portions 10 (three in FIG. 3) between the inner surface 81 of the yoke 8 and the outer surface 92 of the operating magnet 9, the positions being apart from one another at the same angular intervals in the circumferential direction. Therefore, the portions between the outer surface 82 of the operating magnet 9 and the inner surface 81 of the yoke 8 and corresponding to the portions among the bonding portions 10 are formed into non-bonding portions 11 each of which is formed in a wide angular range.

The operating magnet 9 and the yoke 8 are relatively positioned such that the yoke separating slit 85 is positioned at one of the inflection points 96 of the magnetized magnetic poles of the operating magnet 9.

Change During Thermal Expansion

Figure 4A:
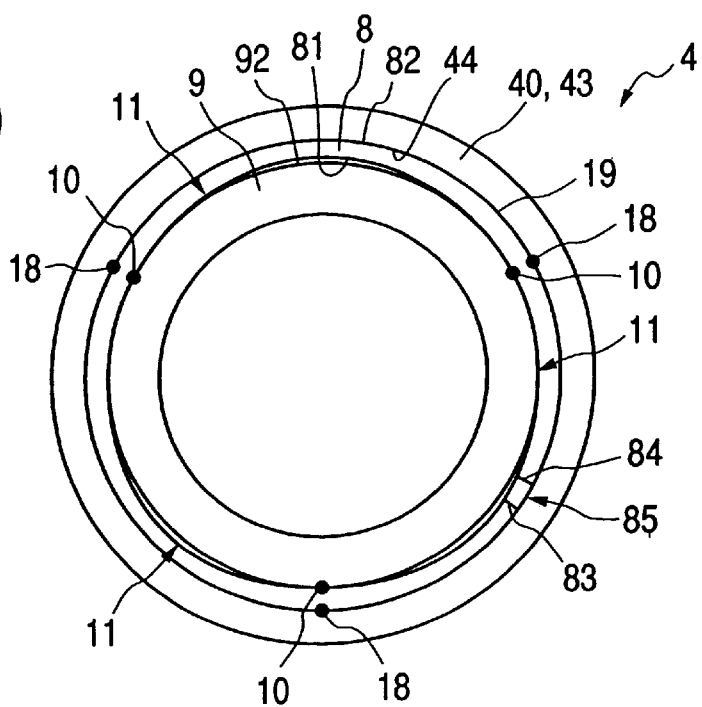
FIG. 4 (A) is a schematic view showing a state in which the rotor of the motor shown in FIG. 1 has been expanded because the temperature has been raised and FIG. 4 (B) is a schematic view showing a state in which the rotor of the motor shown in FIG. 1 has been expanded owing to high speed rotation.
Figure 4B:
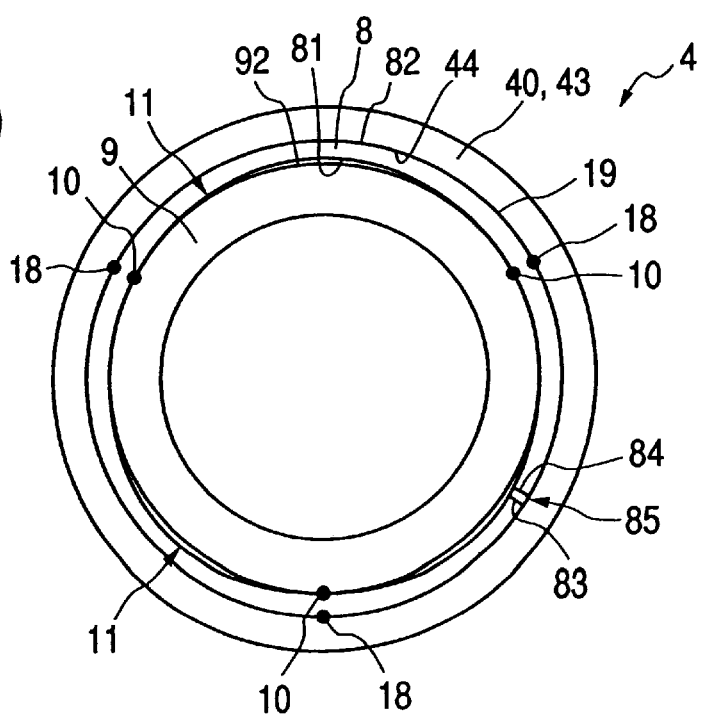

The motor 1 according to this embodiment and structured as described above has the rotor case 40 made of the aluminum alloy and the yoke 8 made of steel. Therefore, the rotor case 40 has a thermal expansion coefficient which is larger than that of the yoke 8. Therefore, when the ambient temperature has been raised, the cylindrical portion 43 of the rotor case 40 is expanded by heat as compared with the yoke 8. Therefore, this embodiment has the structure that the yoke 8 has the yoke separating slit 85 which can be opened in the circumferential direction. Moreover, the yoke 8 is manufactured by bending the thin plate 80, such as a rolled plate, made of a magnetic material. Therefore, the yoke 8 can locally be deformed. Thus, when the ambient temperature is raised and the cylindrical portion 43 of the rotor case 40 is greatly expanded by heat as compared with the yoke 8, the yoke 8 is pulled by the cylindrical portion 43 and thus the yoke separating slit 85 is widened, as shown in FIG. 4 (A). Therefore, the yoke 8 is expanded to an extent greater than its thermal expansion. Thus, the yoke 8 follows the thermal expansion of the cylindrical portion 43. Therefore, any excess force is not exerted on the cylindrical portion 43 of the rotor case 40. It leads to a fact that distortion of the cylindrical portion 43 of the rotor case 40 can be prevented. As a result, imbalance of the rotor case 40 can be prevented.

The outer surface 82 of the yoke 8 is bonded to the inner surface 44 of the cylindrical portion 43 of the rotor case 40 at the plural portions apart from one another in the circumferential direction. Therefore, the portions (the non-bonding portions 19) of the cylindrical portion 43 of the rotor case 40 which are not bonded to the outer surface 82 of the yoke 8 can be expanded somewhat independently from the yoke 8. Since the yoke 8 is manufactured by bending the thin plate 80, such as a rolled plate, local deformation of the yoke 8 is permitted. Therefore, when the ambient temperature has been raised, the cylindrical portion 43 of the rotor case 40 is expanded by heat as compared with the yoke 8. If deformation of the yoke 8 cannot follow the deformation of the cylindrical portion 43 of the rotor case 40 in the above-mentioned state, the difference in the amount of deformation can be absorbed by the deformation of the portions of the yoke 8 corresponding to the non-bonding portions 19. Therefore, deformation of the rotor case 40 which causes imbalance can be prevented.

Since the thermal expansion coefficient of the rotor magnet 9 is considerably smaller than that of the yoke 8, the thermal expansion of the rotor magnet 9 cannot follow the deformation of the yoke 8 if the ambient temperature has been raised. In this embodiment, the outer surface 92 of the operating magnet 9 is partially bonded to the inner surface 81 of the yoke 8 at the three bonded portions 10 formed apart from one another in the circumferential direction. Therefore, the portions (the non-bonded portions 11) of the inner surface 81 of the yoke 8 which are not bonded to the outer surface 92 of the operating magnet 9 can be expanded somewhat independently from the rotor magnet 9. Therefore, the deformation in the degree of expansion between the yoke 8 and the rotor magnet 9 can be absorbed by the deformation of the portions of the yoke 8 corresponding to the non-bonded portions 11. Therefore, excess force which causes brittle fracture is not exerted on the operating magnet 9. Thus, if the ambient temperature is raised and thus the yoke 8 is expanded greater than the operating magnet 9 as shown in FIG. 4 (A), deformation occurs in the non-bonded portions 11 such that the inner surface 81 of the yoke 8 is separated from the outer surface 92 of the operating magnet 9. Therefore, the yoke 8 deforms to follow the expansion of the operating magnet 9 without exertion of great tension on the operating magnet 9.

When the temperature has been returned to room temperature, the foregoing deformation process is performed in a retrograde order so that the original shape is restored. Therefore, the foregoing process is omitted from description.

Change During High Speed Rotation

When the yoke 8 has been rotated at high speed, the cylindrical portion 43 of the rotor case 40 and the yoke 8 are deformed outwards in the radial direction by the centrifugal force, as shown in FIG. 4 (B). In the foregoing case, also the yoke 8 is deformed similarly to the rotor case 40 differently from the case of the thermal expansion. Therefore, the gap of the yoke separating slit 85 is not considerably widened. Since the operating magnet 9 is made of the brittle material, it is not deformed by the centrifugal force exerted on the rotor magnet 9. Since this embodiment has the structure that the outer surface 92 of the rotor magnet 9 is partially bonded to the inner surface 81 of the yoke 8 at the three bonded portions 10 formed apart from one another in the circumferential direction, the portions (the non-bonded portions 11) of the inner surface 81 of the yoke 8 which are not bonded to the outer surface 92 of the rotor magnet 9 can be expanded somewhat independently from the rotor magnet 9. Therefore, during the high speed rotation, deformation occurs together with the operating magnet 9 in the non-bonded portions 11 such that the inner surface 81 of the yoke 8 is separated from the outer surface 92 of the rotor magnet 9. Therefore, excess force which causes brittle fracture is not exerted on the rotor magnet 9. That is, if the rotor case 40 is rotated at high speed and the yoke 8 is expanded greater than the rotor magnet 9, deformation occurs in the non-bonded portions 11 such that the inner surface 81 of the yoke 8 is separated from the outer surface 92 of the rotor magnet 9. Therefore, the yoke 8 can be deformed together with the rotor magnet 9 without exertion of tension on the rotor magnet 9.

During a low-speed rotation state or after stoppage state has been restored, the foregoing deformation process is performed in a retrograde order so that the original shape is restored. Therefore, the foregoing process is omitted from description.

Second Embodiment

Figure 5:
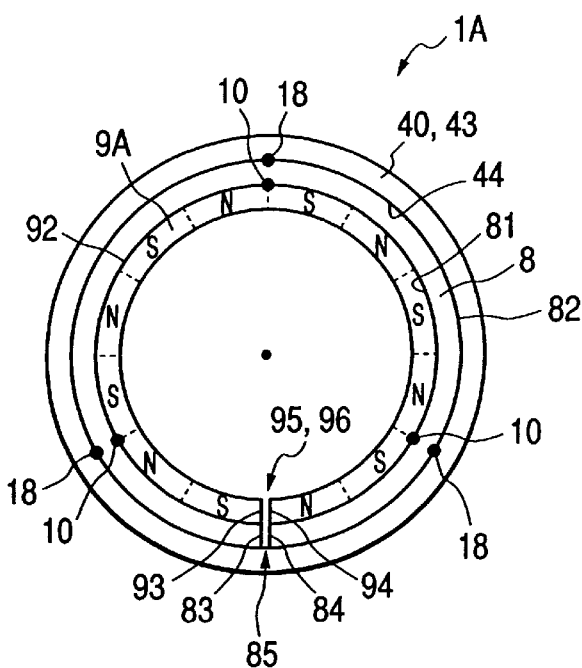
FIG. 5 is a bottom view showing a rotor of a motor according to a second embodiment of the present invention.
Figure 6A:
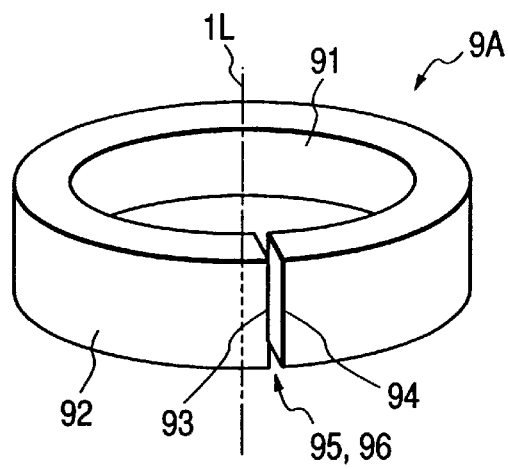
FIG. 6 (A) is a perspective view showing a rotor magnet for use in the motor shown in FIG. 5 and FIG. 6 (B) is a perspective view showing a method of manufacturing the rotor magnet shown in FIG. 6 (A)
Figure 6B:
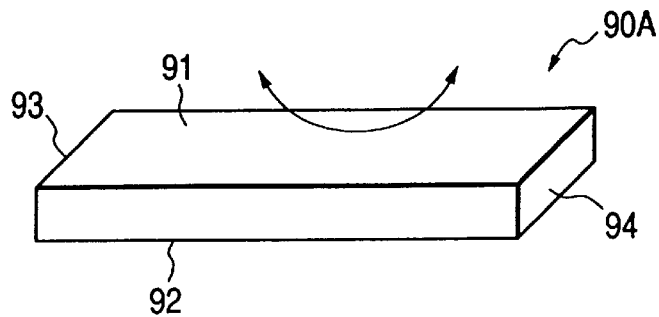

FIG. 5 is a bottom view showing a rotor of a motor according to a second embodiment of the present invention. FIG. 6 (A) is a perspective view showing a rotor magnet for use in the motor according to this embodiment. Note that a motor 1A according to this embodiment has the basic structure which is similar to the motor 1 according to the first embodiment except for the structure of the rotor magnet. Therefore, portions having the common functions are given the same reference numerals and the foregoing portions are omitted from description.

As shown in FIGS. 5 and 6 (A), the motor 1A according to this embodiment has the yoke 8 which has the yoke separating slit 85 according to the first embodiment and which is bonded to the inner surface 44 of the cylindrical portion 43 provided for the rotor case 40.

A rotor magnet 9A is bonded to the inner surface 81 of the yoke 8. The rotor magnet 9A according to this embodiment has a magnet separating slit 95 arranged to separate the rotor magnet 9A in the circumferential direction and formed in the direction of the axial line 1L. The magnet separating slit 95 is formed at one of the inflection points 96 of the magnetized magnetic poles of the rotor magnet 9A. The rotor magnet 9A is a rubber magnet having flexibility.

The rotor magnet 9A structured as described above, as shown in FIG. 6 (B), has a cylindrical shape formed by bending one magnet member 90A containing a binder composed of rubber components and formed into a rectangular plate-like shape such that two ends 93 and 94 of the magnet member 90A in the lengthwise direction are formed opposite to each other. A portion between the two opposite two ends 93 and 94 is formed into the magnet separating slit 95.

The rotor magnet 9A is bonded to the inner surface 81 of the yoke 8 such that the magnet separating slit 95 coincides with the yoke separating slit 85. Therefore, the inflection point 96 of the magnetic pole of the rotor magnet 9A coincides with the yoke separating slit 85. Thus, an influence of the yoke separating slit 85 on the magnetic characteristics of the rotor magnet 9A can be prevented.

Also the motor 1A according to this embodiment and structured as described above has the yoke 8 provided with the yoke separating slit 85. Therefore, if the ambient temperature is changed, the yoke separating slit 85 is expanded/narrowed in the circumferential direction. As a result, the yoke 8 is able to follow expansion/contraction of the cylindrical portion 43 of the rotor case 40.

In this embodiment, the thermal expansion rotor magnet 9A is constituted by the flexible member. The rotor magnet 9A is provided with the magnet separating slit 95. Therefore, when the gap of the magnet separating slit 95 is expanded in the circumferential direction, the diameter of the rotor magnet 9A can be enlarged. When the ambient temperature has been raised to cause the yoke 8 to be expanded greatly as compared with the rotor magnet 9A, the rotor magnet 9A is, therefore, pulled by the yoke 8. In the foregoing case, the gap of the yoke separating slit 85 is widened. Therefore, the rotor magnet 9A can be expanded outwards in the radial direction to an extent greater than the thermal expansion of the rotor magnet 9A. Thus, the rotor magnet 9A is able to follow the expansion of the yoke 8. As a result, expansion of the yoke 8 to follow the cylindrical portion 43 cannot be prevented by the rotor magnet 9A.

When the gap of the magnet separating slit 95 is narrowed, the diameter of the rotor magnet 9A can be reduced. Therefore, if the ambient temperature is lowered causing the yoke 8 to be considerably and inwards contracted by heat in the radial direction by the rotor magnet 9A, the rotor magnet 9A is sometimes inwards pushed by the yoke 8. In the foregoing case, the gap of the yoke separating slit 85 is narrowed. Therefore, the rotor magnet 9A can be narrowed inwards in the radial direction to an extent exceeding the thermal contraction of the rotor magnet 9A. It leads to a fact that the rotor magnet 9A is able to follow the contraction of the yoke 8. Thus, contraction of the yoke 8 to follow the cylindrical portion 43 cannot be prevented by the rotor magnet 9A.

Also in this embodiment, when the ambient temperature is changed, the yoke 8 and the rotor magnet 9A do not prevent thermal expansion and thermal contraction of the cylindrical portion 43, as described above. Therefore, distortion of the cylindrical portion 43 can be prevented. As a result, imbalance of the rotor 4 can be prevented.

The rotor magnet 9A is made of the flexible member and the diameter of the rotor magnet 9A can be changed by the magnet separating slit 95. Therefore, breakage of the rotor magnet 9A can be prevented when the rotor magnet 9A is pulled by the yoke 8 owning to thermal expansion or centrifugal force or when it is pushed inwards by the yoke 8 owning to thermal contraction.

In this embodiment, the yoke 8 is able to follow the expansion and contraction of the cylindrical portion 43. Moreover, the rotor magnet 9A is able to follow the expansion and contraction of the yoke 8. Therefore, a state of bonding between the yoke 8 and the cylindrical portion 43 and between the rotor magnet 9A and the yoke 8 can be maintained.

Other Embodiments

Figure 7:
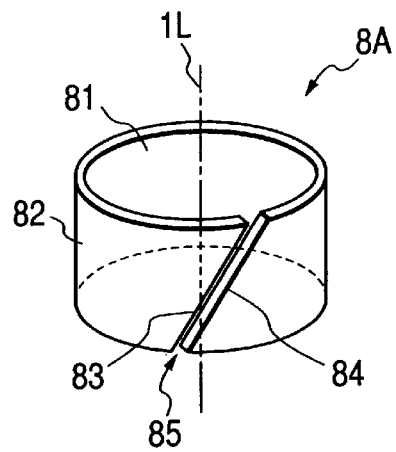
FIG. 7 is a perspective view showing a modification of the yoke.

In each of the above-mentioned embodiments, the yoke separating slit 85 is extended in parallel to the axial line 1L. It is preferable that the yoke 8A is formed such that the yoke separating slit 85 is formed diagonally with respect to the axial line 1L, as shown in FIG. 7. Also it is preferable that the magnet separating slit 95 provided for the rotor magnet 9A is formed diagonally with respect to the axial line 1L. When the foregoing structure is employed, rapid change in the magnetic field at a specific position in the circumferential direction which occurs owning to existence of the slit can be prevented if the slit (the yoke separating slit 85 and the magnet separating slit 95) is widened.

Figure 8:
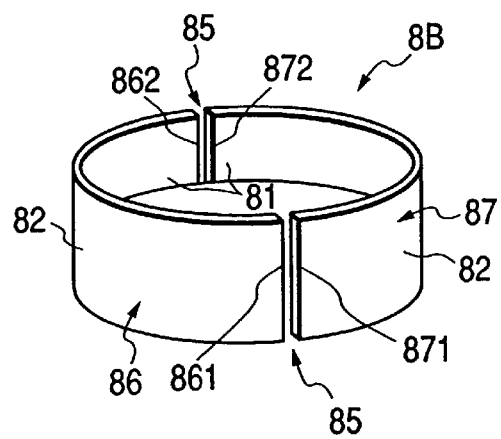
FIG. 8 is a perspective view showing a modification of the yoke.

In each of the foregoing embodiments, one yoke separating slit 85 is formed. As shown in FIG. 8, a plurality of the yoke separating slits 85 may be formed. For example, the yoke 8B shown in FIG. 8 has two yoke separating slits 85 formed apart from each other for an angular interval of 180°. The foregoing yoke 8B is manufactured by bending two rectangular rolled plates 86 and 87 having the same lengths into circular arc shape. Then, ends 861 and 862 of the rolled plate 86 in the lengthwise direction and the ends 871 and 872 of the other rolled plate 87 in the lengthwise direction are positioned opposite to one another in the circumferential direction. Therefore, the above-mentioned structure is arranged such that the yoke separating slits 85 are formed among the ends 861 and 862 of the rolled plate 86 and the ends 871 and 872 of the other rolled plate 87.

Figure 9:
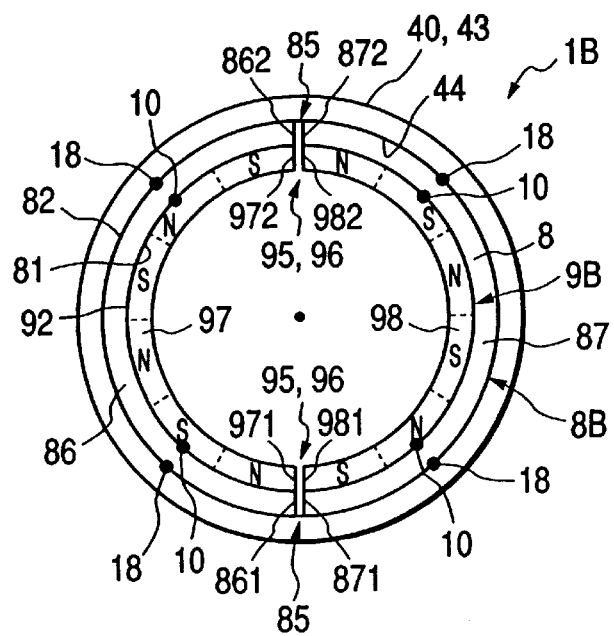
FIG. 9 is a bottom view showing a state in which the modified rotor magnet and the yoke have been fixed to the rotor.

In the second embodiment, one magnet separating slit 95 is formed. As shown in FIG. 9, a plurality of the magnet separating slit 95 may be formed. For example, a rotor magnet 9B of a motor 1B shown in FIG. 9 has two magnet separating slits 95 formed apart from each other by an angular interval of 180°. The rotor magnet 9B is manufactured by bending two rectangular magnet members 97 and 98 having the same length and containing a binder composed of rubber components into the circular arc shape. Moreover, ends 971 and 972 of the magnet member 97 in the lengthwise direction and ends 981 and 982 of the other magnet member 98 in the lengthwise direction are positioned opposite to one another in the circumferential direction. Therefore, the above-mentioned structure is arranged such that the magnet separating slits 95 are formed among the ends 971 and 972 of the magnet member 97 and the ends 981 and 982 of the magnet member 98.

As can be understood from FIG. 9, the rotor magnet 9B and the yoke 8B are bonded to each other such that the magnet separating slits 95 of the rotor magnet 9B and the yoke separating slits 85 of the yokes 8B coincide with one another. Therefore, a manufacturing method can be employed with which the magnet members 97 and 98 are bonded and secured to the rolled plates 86 and 87. Then, the bonded members are bonded to the cylindrical portion 43 of the rotor case 4.

In the foregoing embodiments, the motors 1A and 1B for use as the rotating apparatus for the rotary polygonal-mirror 7 have been described. The present invention may be applied to another motor.

As described above, the motor according to the present invention has the yoke which is provided with yoke separating slit for separating the yoke in the circumferential direction. Therefore, if force for enlarging the diameter of the yoke is exerted, the yoke separating slit is widened.

Thus, the diameter of the yoke can be enlarged. Therefore, if the ambient temperature is raised, the cylindrical portion of the rotor case is expanded greatly as compared with the yoke because the thermal expansion coefficient of the rotor case is larger than that of the yoke. In the foregoing case, the yoke separating slit is widened such the yoke separating slit is pulled by the cylindrical portion of the rotor case. Therefore, the yoke is deformed to follow the deformation of the cylindrical portion of the rotor case. Thus, excess force is not exerted on the cylindrical portion of the rotor case. As a result, distortion of the rotor case can be prevented. Thus, imbalance of the rotor case can be prevented.

What is claimed is:

1. A motor comprising:
   a rotor case having a cylindrical portion;
   a cylindrical yoke fixed to an inner surface of said cylindrical portion, said yoke being made of a magnetic material;
   said rotor case and said cylindrical yoke having different coefficients of thermal expansion;
   a cylindrical rotor magnet fixed to an inner surface of said yoke;
   a frame for rotatively supporting said rotor case;
   an armature fixed to said frame, said armature being opposite to said rotor magnet;
   a yoke separating slit for permitting enlargement of a diameter of said yoke by expansion of said slit in a circumferential direction of said yoke, said enlargement and expansion being caused by rotation of the rotor and by heat generated during rotation;
   a plurality of yoke bonding portions where an outer surface of said yoke is bonded to the inner surface of said cylindrical portion, said yoke bonding portions being apart from one another in the circumferential direction; and
   the inner surface of said cylindrical portion and the outer surface of said yoke being permitted to separate from and contact one another between adjoining yoke bonding portions, wherein said yoke separating slit is formed at a position between said adjoining yoke bonding portions and at a position corresponding to an inflection point of a magnetic pole of said rotor magnet.

2. A motor according to claim 1, wherein said yoke has a thickness with which local deformation thereof is permitted.

3. A motor according to claim 1, further comprising:
   non-bonding portions formed in the circumferential direction between said adjoining bonding portions such that the angular range of each of the non-bonding portions is larger than the angular range of each of the bonding portions.

4. A motor according to claim 1 further comprising:
   a plurality of magnet bonding portions where an outer surface of said magnet is bonded to the inner surface of said yoke, said magnet bonding portions being apart from one another in the circumferential direction; and
   the inner surface of said yoke and the outer surface of said magnet being permitted to separate from and contact one another between adjoining magnet bonding portions.

5. A motor according to claim 4, wherein non-bonding portions are formed between the outer surface of said rotor magnet and the inner surface of said yoke in the circumferential direction between said adjoining magnet bonding portions such that the angular range of each of the non-bonding portion is larger than the angular range of each of the bonding portions.

6. A motor according to claim 4, wherein said magnet bonding portions and said yoke bonding portions are substantially the same positions in terms of a radial direction of said rotor, and said yoke separating slit is formed between said adjoining yoke bonding portions.

7. A motor according to claim 1, wherein said rotor case is made of aluminum alloy, and said yoke is constituted by a rolled steel plate.

8. A motor according to claim 1, wherein said rotor magnet has flexibility, and said rotor magnet has a magnet separating slit for permitting enlargement of the diameter of said magnet when said magnet separating slit expands in the circumferential direction thereof.

9. A motor according to claim 1, wherein said yoke separating slit is formed at a position corresponding to an inflection point of a magnetic pole of said rotor magnet.

10. A motor according to claim 1, wherein said yoke separating slit is formed diagonally with respect to the axial direction of the cylindrical portion.

11. A motor according to claim 1, wherein an expansion of said yoke follows a thermal expansion of said cylindrical portion.

12. A motor comprising:
    a rotor case having a cylindrical portion;
    a cylindrical yoke fixed to an inner surface of said cylindrical portion said yoke being made of a magnetic material;
    a cylindrical rotor magnet fixed to an inner surface of said yoke;
    a frame for rotatively supporting said rotor case;
    an armature fixed to said frame, said armature being opposite to said rotor magnet;
    a yoke separating slit for permitting enlargement of a diameter of said yoke when said yoke separating slit expands in a circumferential direction of said yoke;
    a plurality of yoke bonding portions where an outer surface of said yoke is bonded to the inner surface of said cylindrical portion, said yoke bonding portions being apart from one another in the circumferential direction;
    the inner surface of said cylindrical portion and the outer surface of said yoke being permitted to separate from and contact one another between adjoining yoke bonding portions;
    a plurality of magnet bonding portions where an outer surface of said magnet is bonded to the inner surface of said yoke, said magnet bonding portions being apart from one another in the circumferential direction;
    the inner surface of said yoke and the outer surface of said magnet being permitted to separate from and contact one another between adjoining magnet bonding portions,
    wherein said magnet bonding portions and said yoke bonding portions are substantially the same positions in terms of a radial direction of said rotor, and said yoke separating slit is formed between said adjoining yoke bonding portions.

* * * * *